United States Patent [19]

Cooley

[11] Patent Number: 5,009,344
[45] Date of Patent: Apr. 23, 1991

[54] BULK MATERIAL HANDLING APPARATUS

[76] Inventor: Edwin L. Cooley, 201 Houser St., Monon, Ind. 47959

[21] Appl. No.: 422,330

[22] Filed: Oct. 16, 1989

[51] Int. Cl.⁵ .............................................. B65D 88/54
[52] U.S. Cl. ..................................... 222/325; 222/609; 222/541; 141/363
[58] Field of Search ................. 222/608, 609, 610, 82, 222/185, 83.5, 541, 545, 465.1, 466, 467, 325, 368, 410, 414, 143, 88, 543; 239/651, 681, 687, 309; 141/363, 364, 366

[56] References Cited

U.S. PATENT DOCUMENTS

| | | | |
|---|---|---|---|
| 3,171,449 | 3/1965 | Ellms et al. | 141/330 |
| 3,344,958 | 10/1967 | Kaanehe | 222/325 X |
| 3,602,400 | 8/1971 | Cooke | 222/143 X |
| 4,120,420 | 10/1978 | Dirksing | 222/88 X |
| 4,234,105 | 11/1981 | Viramontes | 222/414 X |
| 4,252,773 | 2/1981 | Spiegel et al. | 222/325 X |
| 4,307,763 | 12/1981 | Wang | 141/364 |
| 4,627,476 | 12/1986 | Wilcke | 141/364 |
| 4,789,082 | 12/1988 | Sampson | 222/541 X |
| 4,953,729 | 9/1990 | Kloosterhouse | 222/541 |

FOREIGN PATENT DOCUMENTS 2532800 10/1977 Fed. Rep. of Germany ........ 222/88
8804279 6/1988 World Int. Prop. O. .......... 222/466

Primary Examiner—Donald T. Hajec
Assistant Examiner—Gregory L. Huson
Attorney, Agent, or Firm—John H. Calhoun, Jr.

[57] ABSTRACT

A bulk material handling apparatus comprising a spreader and a double sealed rigid container for dusty solid materials wherein the first seal may be removed from the container and the container may be inverted and lowered into and fixed in the top of the spreader after which the second seal may be removed to release materials from the container into the bottom of the spreader without creating a dust cloud.

5 Claims, 1 Drawing Sheet

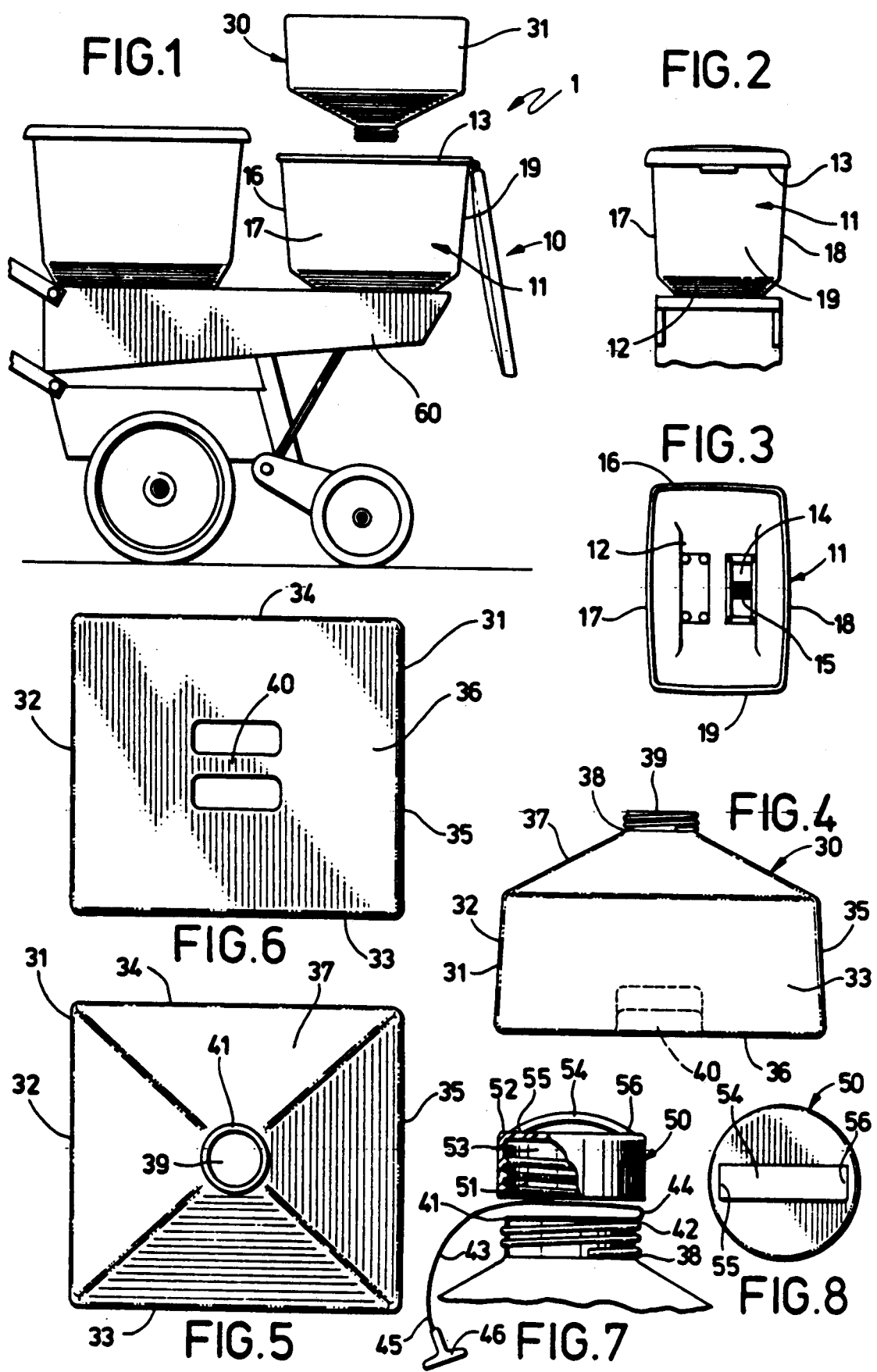

BULK MATERIAL HANDLING APPARATUS

BACKGROUND OF THE INVENTION

The present invention relates to an improved bulk material handling system for handling pulverized solid materials that are likely to create a dust cloud when being transferred from a container such as a bag to a receptacle such as a spreader. The apparatus of the present invention is of the kind that would be especially useful to farmers when spreading finely granulated solid materials on a field.

It is a common practice for farmers to apply various chemicals to their fields by placing the chemicals in suitably designed spreaders and pulling the spreaders behind tractors. One common practice is to apply finely granulated solid insecticide on fields by dumping 50 pound bags of insecticide into a box-like spreader having a metering gate and a metering wheel in the bottom, and then pulling the spreader behind a tractor to dispense the solid insecticide onto the ground. When a farmer dumps a bag of insecticide into such a spreader an insecticide dust cloud is generated, which results in a loss of material. Also, the insecticide dust cloud frequently envelops the farmer, which is both a nuisance and a hazard to the farmer's health.

This invention relates to a new and useful bulk material handling system, and more particularly a bulk material handling system for handling pulverized solid materials like finely granulated solid insecticides. Bulk material handling systems for handling pulverized solid materials are well known in the prior, as illustrated in U.S. Pat. No. 3,171,449 which issued to Edward H. Ellms, et al. on Mar. 2, 1965, and which shows an apparatus that may be readily operated to substantially eliminate dusting difficulties during transfer of large bulk quantities of dusty solid materials from one container to another. While Ellms apparatus appears to be useful for many purposes, it is not well suited for dust-free loading of farm spreaders with bulk quantities of dusty solid materials, like insecticides.

The present invention provides a novel and useful bulk material handling system that very greatly reduces dust formation when transferring bulk quantities of dusty solid materials like insecticides from shipping and storage containers into spreaders of the kind most commonly used on farms.

SUMMARY OF THE INVENTION

The bulk material handling system of the present invention has all the advantages of systems currently known in the prior art for transferring bulk quantities of dusty solid materials to farm spreaders, and in addition it provides several distinct and important advantages not found in previously known systems.

The most commonly used spreaders are box-like structures having a metering gate and metering wheel located in the bottom thereof. Spreaders are usually loaded from the top by merely pouring bags of dusty material into the spreader. Spreaders are then usually closed by placing lids over their tops. The pouring operation tends to produce a dust cloud, with a resultant loss of material and annoyance and danger to the farmer. This problem is particularly serious when spreaders are loaded or re-loaded in fields on windy days.

The primary objective of the present invention is to provide a bulk material handling system that will allow farmers to load and re-load spreaders with bulk quantities of dusty solid materials, like finely pulverized solid insecticides, without generating dust.

Another object of the present invention is to provide an apparatus that can be used as conveniently on windy days as on calm days.

Another object of the present invention is to provide an apparatus that is compatible with spreaders that are commonly used by farmers at the present time.

Another object of the present invention is to provide a bulk material handling system that is simple in construction, inexpensive, strong and durable, and well adapted for the purposes for which it is designed.

Other objects and advantages of the present invention will become apparent from a consideration of the following detailed description taken in connection with the accompanying drawings wherein a preferred embodiment of the invention is shown.

It should be understood that the invention is not limited to the details disclosed, but includes all such variations and modifications as fall within the spirit of the invention and the scope of the appended claims.

The objectives of the present invention are accomplished by combining a spreader of a kind commonly used by farmers and a closeable, rigid bulk container for pulverulent dusty materials, such as granulated solid insecticide. The container may be filled and sealed at a plant, and then transported to a farm for storage and use. At the farm, the filled and sealed container is inverted and lowered into the top of the spreader and thereafter the seal is conveniently broken to release the material into the spreader without generating a dust cloud.

The container of the present invention is adapted to be loaded into the top of a spreader and secured therein by wedging the container in the spreader or by other suitable means. After the container is loaded into the spreader and is secured therein, the container is opened to release the materials which fall under the force of gravity out of the container and into the bottom of the spreader, which is only a few inches at most from the opening in the container. Only a small portion of the material in the container is transferred immediately into the spreader. As the material pours from the container into the spreader the level of material rises in the spreader, and when the level rises to the mouth of the container, the material in the spreader acts as a dam to stop the flow of additional material into the spreader. The bulk of the materials is retained in the container and is gradually fed into the spreader as materials already in the spreader are metered out of the spreader and onto the ground. As the materials feed out of the container and into the spreader they are protected by the walls and lid of the spreader against the forces of any winds that might be blowing across the field. Since the materials are fed gradually into the spreader, fall only a short distance to the top of the material already in the spreader, and are protected against wind, dust cloud formation is eliminated. The presence of the bulk container in the top of the spreader serves as an additional partial seal for the spreader, thus further reducing the likelihood of dust formation. Further, since most of the bulk materials are transferred from the container to the spreader during spreading operations, the farmer is in or on the tractor and thus removed from any small amount of dust that may be generated as the material feeds into the spreader. Thus it can be seen that dust formation with its consequent loss of material and danger to the farmer is greatly reduced over the present method where the farmer merely pours bags of materials into a spreader while being enveloped in any resulting dust cloud.

In the illustrated embodiment, the spreader is a box-like structure, more or less rectangular in form, tapered slightly toward the bottom and having a metering gate and a metering wheel in the bottom thereof. The container is a jug-like structure, more or less rectangular in form, having a pyramid shaped shoulder and a threaded neck adapted to be closed with a screw cap. In practice, the container is loaded with pulverized material. A tear-away tape seal is then placed over the mouth of the container to seal the container. One end of a tether is attached to the tear-away tape seal. In the field, the cap is removed from the top of a full container; the container is inverted and placed into the top of the spreader; and the seal tape is removed from the inverted container by pulling it off with the tether, whereupon the materials start to empty out of the container and into the bottom of the spreader without dust cloud formation.

BRIEF DESCRIPTION OF THE DRAWINGS

A preferred embodiment of the present invention is illustrated in the accompanying drawings in which:

FIG. 1 is a side elevation view of the apparatus of the present invention;

FIG. 2 is an end elevation view of a spreader of the present invention;

FIG. 3 is a top plan view of an open spreader of the present invention;

FIG. 4 is a side elevation view of the rigid container of the present invention;

FIG. 5 is a top plan view of the container of the present invention;

FIG. 6 is a bottom view of the container of the present invention;

FIG. 7 is an enlarged view of the neck of the container of the present invention; and FIG. 8 is a top plan view of the cap of the present invention.

DESCRIPTION OF THE PREFERRED EMBODIMENT

Referring now to the drawings in greater detail, FIG. 1 illustrates the bulk material handling apparatus of the present invention shown generally at 1. The apparatus comprises a spreader 10 that is well known in the art and a rigid bulk container 30 for pulverulent dusty materials, such as granulated solid insecticide, that is adapted to be inverted and lowered into the spreader 10 from the top.

FIGS. 1, 2 and 3 show that the spreader 10 comprises a bin 11 adapted to be mounted on a trailer 60 for pulling behind a tractor and having in the bottom 12 of the said bin 11 a metering gate 14 and a metering wheel 15 adapted to spread finely granulated solid material on the ground when the trailer 60 is pulled by a tractor.

In the illustrated embodiment the bin 11 is generally rectangular in form and comprises a front wall 16, two side walls 17, 18, and a back wall 19. The bin 11 is slightly tapered towards the bottom 12, so that front and back walls 16, 19 and opposing side walls 17, 18 are a bit closer at the bottom 12 of the bin 11 than at the top 13 of the bin 11. Bins 11 of this general configuration and having suitable metering gates and wheels are well known and commonly used.

FIGS. 1, 4, 5, and 6, show the rigid bulk container 30 as a jug-like structure comprising a generally rectangular body 31 formed by a front wall 32, two side walls 33, 34, a back wall 35, and a bottom 36 that extends between and is integral with the walls 32, 33, 34, 35 at their bottoms and that seals the bottom of the container, a pyramid shaped shoulder 37 that extends upward from the tops of the walls 32, 33, 34, 35, and a neck 38 that is integral with and extends upward from the shoulder 37, the said neck having a closable opening or mouth 39 and having external screw threads provided at its upper end, which threaded neck 38 is adapted to receive a cap 50 screwed thereon for sealing the top of the container 30, and an internally threaded cap 50 adapted to be screwed onto the neck 38 of the container 30 and to seal the mouth 39 of the container 30.

As shown in FIGS. 4 and 6, a handle 40 is formed in the bottom 36 of the container 30 for convenience in inverting the container 30 and lowering it into the spreader 10.

FIG. 7 shows the externally threaded neck 38 of the container 30 and a screw cap 50 adapted to seal the mouth 39 of the container 30. A seal 41 of conventional construction covers the mouth 39 of the container 30. One end 44 of a tether 43 is attached to the edge 42 of the seal 41 and the other end 45 of the tether 43 is provided with a small handle 46 for convenience in pulling on the tether 43. The internal threads 51 in the screw cap 50 terminate some distance below the top 52 of the cap 50 so that when the cap 50 is tightly screwed onto the neck 38 a space 53 will be present between the seal 41 and the top 52 of the cap 50 for storage of the tether 41 during shipping and storage.

As shown in FIGS. 7 and 8, a strap 54 is attached at its two ends 55, 56 to the top 50 to serve as a handle for conveniently lifting and carrying the container 30.

The container 30 is tapered towards the top so that the distance between the sides 33, 34 is somewhat greater at the bottom 36 of the container 30 than at the top of the container 30. At the top of the container 30, the distance between the side walls 33, 34 of the container 30 is determined so that such distance is less than the distance between the sides 17, 18 of the spreader at their closest point, ie at their bottoms. At the bottom of the container 30, the distance between the side walls 33, 34 of the container 30 is determined so that such distance is greater than the distance between the sides 17, 18 of the spreader at its widest point, ie at its top. The height of the container 30 is less than the depth of the spreader 10. Thus it can be seen that if a container 30 is inverted and lowered into a spreader 10, the sides 33, 34 of the container 30 will become wedged against the sides 17, 18 of the spreader 10, thus preventing the inverted top of the container 30 from reaching the bottom 12 of the spreader 10. It will be readily apparent that other means might be used to secure the container in the top of the spreader, however the wedging means just described has the advantages of simplicity and low cost.

The distance between the front 32 and the back 35 of the container 30 is determined such that the said distance is less than the distance between the front 16 and the back 19 of the spreader 10. Therefore, if a container 30 is inverted and lowered into a spreader 10, a space will exist between the front 16 of the spreader 10 and front 32 of the container 30 or between the back 19 of the spreader 10 and the back 35 of the container 30, or both. After a container 30 is inverted and lowered into a spreader 10, a farmer may reach into this space, grasp the handle 46 on the end 45 of the tether 43, and pull the seal 41 off the mouth 39 of the container 30 to release the material into the spreader 10.

To use the apparatus 1, a farmer would first remove the screw cap 50 from the top of the container 30. The farmer would then tilt the container to the side, reach under the container, grasp the handle 40, invert the container 30, and lower the inverted container 30 into the spreader 10 until the sides 33, 34 of the container 30 become wedged against the sides 17, 18 of the spreader 10. The farmer would then reach down through the space between the front 32 of the container 30 and the front 16 of the spreader 10 or the space between the back 35 of the container 30 and the back 19 of the spreader 10 where he would grasp the tether handle 46 and pull the seal 41 off, thus releasing material into the bottom of the spreader.

Having thus described my invention, what I now claim is:

1. A rigid bulk container having a shoulder and a threaded neck at the top thereof, said neck being adapted to receive a cap screwed thereon, and having a mouth at the top of the said neck and a tape seal adapted to close the said mouth and a tether attached at one end to the said seal and attached at the other end to a handle which handle is adapted to be pulled for removal of the said seal from the mouth of the said container, said container having provided in the bottom thereof a handle adapted for grasping by a person and said container having sides that are tapered towards the top and a threaded cap adapted to be screwed onto the neck of the said container and adapted to seal the said container, wherein the said cap is provided with a storage compartment adapted for storage of the said tether and tether handle and an external handle adapted for carrying the container.

2. A material handling apparatus comprising an upward opening bin adapted to be mounted on a trailer and having a bottom wherein the said bottom is provided with a metering gate and a metering wheel adapted to spread finely granulated solid material on the ground and wherein the sides of the said bin are tapered towards the bottom and a rigid bulk container having a shoulder and a threaded neck at the top thereof, said neck being adapted to receive a cap screwed thereon, and having a mouth at the top of the said neck and a tape seal adapted to close the said mouth and a tether attached at one end to the said seal and attached at the other end to a handle which handle is adapted to be pulled for removal of the said seal from the mouth of the said container, said container having sides that are tapered towards the top, and said container being shorter than the said bin and being adapted to be inverted and wedged into the top of the said bin, and a threaded cap adapted to be screwed onto the neck of the said container and adapted to seal the said container, wherein the said cap is provided with a storage compartment adapted for storage of the said tether and tether handle.

3. A material handling apparatus comprising an upward opening bin adapted to be mounted on a trailer and having a bottom wherein the said bottom is provided with a metering gate and a metering wheel adapted to spread finely granulated solid material on the ground and wherein the sides of the said bin are tapered towards the bottom and a rigid bulk container having a shoulder and a threaded neck at the top thereof, said neck being adapted to receive a cap screwed thereon, and having a mouth at the top of the said neck and a tape seal adapted to close the said mouth and a tether attached at one end to the said seal and attached at the other end to a handle which handle is adapted to be pulled for removal of the said seal from the mouth of the said container, said container having provided in the bottom thereof a handle adapted for grasping by a person and said container having sides that are tapered towards the top, and said container being shorter than the said bin and being adapted to be inverted and wedged into the top of the said bin, and a threaded cap adapted to be screwed onto the neck of the said container and adapted to seal the said container, wherein the said cap is provided with a storage compartment adapted for storage of the said tether and tether handle and an external handle adapted for carrying the container.

4. A material handling apparatus comprising an upward opening bin adapted to be mounted on a trailer and having a bottom wherein the said bottom is provided with a metering gate and a metering wheel adapted to spread finely granulated solid material on the ground and wherein the sides of the said bin are tapered towards the bottom and a rigid bulk container having a shoulder and a threaded neck at the top thereof, said neck being adapted to receive a cap screwed thereon, and having a mouth at the top of the said neck and a tape seal adapted to close the said mouth and a tether attached at one end to the said seal and attached at the other end to a handle which handle is adapted to be pulled for removal of the said seal from the mouth of the said container, said container having provided in the bottom thereof a handle adapted for grasping by a person and said container having sides that are tapered towards the top, and said container being shorter and thinner than the said bin and being adapted to be inverted and wedged into the top of the said bin, and a threaded cap adapted to be screwed onto the neck of the said container and adapted to seal the said container, wherein the said cap is provided with a storage compartment adapted for storage of the said tether and tether handle and an external handle adapted for carrying the container.

5. In a material handling apparatus comprising an upward opening bin adapted to be mounted on a trailer and having a bottom wherein the said bottom is provided with a metering gate and a metering wheel adapted to spread finely granulated solid material on the ground and wherein the sides of the said bin are tapered towards the bottom that improvement comprising a rigid bulk container having a shoulder and a threaded neck at the top thereof, said neck being adapted to receive a cap screwed thereon, and having a mouth at the top of the said neck and a tape seal adapted to close the said mouth and a tether attached at one end to the said seal and attached at the other end to a handle which handle is adapted to be pulled for removal of the said seal from the mouth of the said container, said container having provided in the bottom thereof a handle adapted for grasping by a person and said container having sides that are tapered towards the top, and said container being shorter and thinner than the said bin and being adapted to be inverted and wedged into the top of the said bin, and a threaded cap adapted to be screwed onto the neck of the said container and adapted to seal the said container, wherein the said cap is provided with a storage compartment adapted for storage of the said tether and tether handle and an external handle adapted for carrying the container.

* * * * *